(12) United States Patent
Young et al.

(10) Patent No.: US 6,791,994 B1
(45) Date of Patent: Sep. 14, 2004

(54) METHOD AND APPARATUS FOR ASSIGNING RECEIVE SLOTS IN A DYNAMIC ASSIGNMENT ENVIRONMENT

(75) Inventors: C. David Young, Plano, TX (US); Edgar L. Caples, Allen, TX (US); Jeffrey A. Barton, Richardson, TX (US); James A. Stevens, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/552,144

(22) Filed: Apr. 19, 2000

(51) Int. Cl.[7] .................................................. H04J 4/00
(52) U.S. Cl. ...................................... 370/436; 370/631
(58) Field of Search .............................. 370/436, 310, 370/312, 313, 314, 315, 321, 329, 330, 345, 365, 431, 432, 442, 478, 461, 462

(56) References Cited

U.S. PATENT DOCUMENTS

| | | | |
|---|---|---|---|
| 4,763,322 A | 8/1988 | Eizenhofer | 370/337 |
| 5,117,422 A | 5/1992 | Hauptschein et al. | 370/255 |
| 5,245,609 A | 9/1993 | Ofek et al. | 370/348 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopolous et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopolous et al. | 370/330 |
| 5,598,417 A | 1/1997 | Crisler et al. | 370/348 |
| 5,625,629 A | 4/1997 | Wenk | 370/330 |
| 5,652,751 A | 7/1997 | Sharony | 340/2.4 |
| 5,696,903 A | 12/1997 | Mahany | 709/228 |
| 5,719,868 A | * 2/1998 | Young | 370/436 |
| 5,742,593 A | 4/1998 | Sharony et al. | 370/347 |

(List continued on next page.)

OTHER PUBLICATIONS

Young, "USAP: A Unifying Dynamic Distributed Multichannel TDMA Slot Assignment Protocol," Proc. IEEE MILSOM 1996, vol. 1, Oct. 1996.

L. Pond and V. Li, "Bridging the Gap Interoperability, Survivability, Security," 1989 IEEE MILCOM, Conference Record, vol. 1 of 3.

(List continued on next page.)

*Primary Examiner*—Douglas Olms
*Assistant Examiner*—Ricardo M. Pizarro
(74) *Attorney, Agent, or Firm*—Nathan O. Jensen; Kyle Eppele

(57) ABSTRACT

A method and apparatus for the receiver directed assignment of receive slots in a dynamic assignment communication system. The apparatus including a memory component storing communication assignment data for a plurality of time slots in a time multiplex structure and a processor component capable of identifying a set of available time slots from the plurality of time slots. The apparatus being capable of assigning itself a receive slot, which can be a broadcast receive slot, from the set of available time slots. The method involves establishing a network wherein network communication is accomplished via assignment of specific time slots of a time multiplex structure. The method further involves determining a set of available time slots suitable for reception, by a receiving node, of a communication from a neighboring node, the receiving node then assigning to itself a receive slot from the set of available time slots. The method and apparatus are also capable of handling transmissions from a plurality of neighboring devices during a broadcast receive slot. This can be accomplished by a scheduling technique, a random access technique or a code division multiple access technique.

20 Claims, 5 Drawing Sheets

U.S. PATENT DOCUMENTS

| | | | | |
|---|---|---|---|---|
| 5,748,362 | A | 5/1998 | Delacourt et al. | 359/326 |
| 5,920,703 | A | 7/1999 | Campbell et al. | 709/236 |
| 5,949,760 | A * | 9/1999 | Stevens et al. | 370/254 |
| 5,983,259 | A | 11/1999 | Campbell et al. | 709/200 |
| 6,018,528 | A | 1/2000 | Gitlin et al. | 370/436 |
| 6,031,827 | A | 2/2000 | Rikkinen et al. | 370/330 |
| 6,084,888 | A | 7/2000 | Watanabe et al. | 370/473 |
| 6,084,889 | A | 7/2000 | Murakami | 370/474 |
| 6,094,425 | A | 7/2000 | Auger et al. | 370/330 |
| 6,094,429 | A * | 7/2000 | Blanchette et al. | 370/347 |
| 6,157,656 | A | 12/2000 | Lindgren et al. | 370/458 |
| 5,953,344 | A1 | 5/2001 | Dail et al. | 370/337 |
| 6,252,868 | B1 | 6/2001 | Diachina et al. | 370/347 |
| 6,256,304 | B1 * | 7/2001 | Vayrynen | 370/350 |
| 6,256,477 | B1 * | 7/2001 | Eidson et al. | 455/63.3 |
| 6,275,506 | B1 | 8/2001 | Fazel et al. | 370/459 |
| 6,304,559 | B1 | 10/2001 | Jacklin et al. | 370/310 |
| 6,310,867 | B1 | 10/2001 | Tat et al. | 370/254 |
| 6,314,084 | B1 | 11/2001 | Kahale et al. | 370/230 |
| 6,317,436 | B1 * | 11/2001 | Young et al. | 370/443 |
| 6,324,184 | B1 | 11/2001 | Hou et al. | 340/7.43 |
| 6,331,973 | B1 * | 12/2001 | Young et al. | 370/337 |
| 6,353,598 | B1 | 3/2002 | Baden et al. | 370/280 |
| 6,353,605 | B1 | 3/2002 | Rautanen et al. | 370/337 |
| 6,389,273 | B1 * | 5/2002 | Brandenburg | 455/296 |
| 6,414,955 | B1 * | 7/2002 | Clare et al. | 370/390 |
| 6,466,793 | B1 * | 10/2002 | Wallstedt et al. | 455/450 |
| 6,469,996 | B1 | 10/2002 | Dupuy | 370/337 |
| 6,487,186 | B1 * | 11/2002 | Young et al. | 370/336 |
| 6,504,829 | B1 * | 1/2003 | Young et al. | 370/337 |
| 6,553,424 | B1 * | 4/2003 | Kranz et al. | 709/234 |
| 6,574,199 | B1 * | 6/2003 | Young et al. | 370/254 |
| 6,574,206 | B2 * | 6/2003 | Young | 370/337 |
| 6,600,754 | B1 * | 7/2003 | Young et al. | 370/459 |
| 6,628,636 | B1 * | 9/2003 | Young | 370/337 |
| 6,631,124 | B1 | 10/2003 | Koorapaty et al. | 370/337 |
| 2002/0001294 | A1 | 1/2002 | Amouris | 370/337 |
| 2002/0046381 | A1 | 4/2002 | Morris et al. | 714/752 |

OTHER PUBLICATIONS

Bittle, Caples, Young, "Soldier Phone: An Innovative Approach to Wireless Multimedia Communications," 1998 IEEE MILCOM, vol. 3.

IEEE Transaction on Information Theory, vol. IT–30, No. 4, Jul. 1984.

Sunlin, "A Hybrid Distributed Slot Assignment TDMA Channel Access Protocol," IEEE Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1 Ju et al. "An Optimal Topology–Transport Scheduling Method in Multihop Packet Radio Networks." IEEE/ACM Transactions on Networking. Jun. 1998. pp. 298–306.

Chakraborty et al. "Generic Algorithm for Broadcast Scheduling in Packet Radio Networks," Evolutionary Computation Proceedings, 1998. IEEE World Congress on Computational Intelligence. May 4–9, 1998. pp. 183–188.

Pond et al., "Distributed Time–Slot Assignment Protocol for Mobile Multi–Hop Broadcast Packet Radio Networks," IEEE MILCOM, 1969. Oct. 15–18, 1989. pp. 70–74.

Chou et al. "Slot Allocation Strategies for TDMA Protocols in Multihop Packet Radio Network." Eleventh Annual Joint Conference of the IEEE Computer and Communications Societies. May 4–8, 1992. pp. 710–716.

Oono et al. "Dynamic Slot Allocation Technology for Mobile Multi–Media TDMA Systems Using Distributed Control Scheme," IEEE. Oct. 12–16, 1997. pp. 74–78.

U.S patent application Ser. No. 09/650,332, "Scheduling Techniques for Receiver Directed Broadcast Applications," filed Aug. 29, 2000, C. David Young.

U.S. patent application Ser. No. 09/562,549, "Efficient Grouping of Control and User Data," filed May 2, 2000, J.A. Stevens et al. U.S. patent application Ser. No. 09/303,802, "Clique Activation Multiple Access," filed Apr. 30, 1999, C. D. Young et al.

* cited by examiner

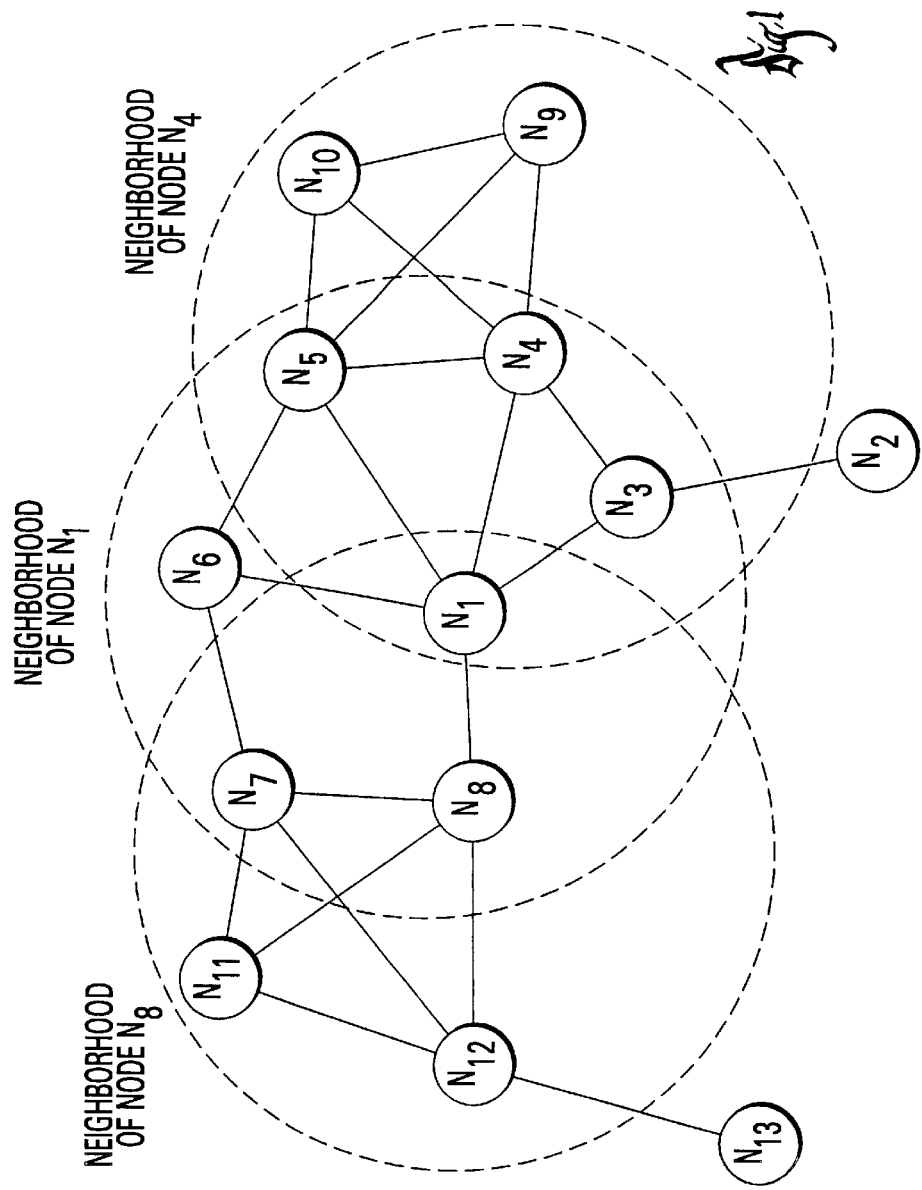

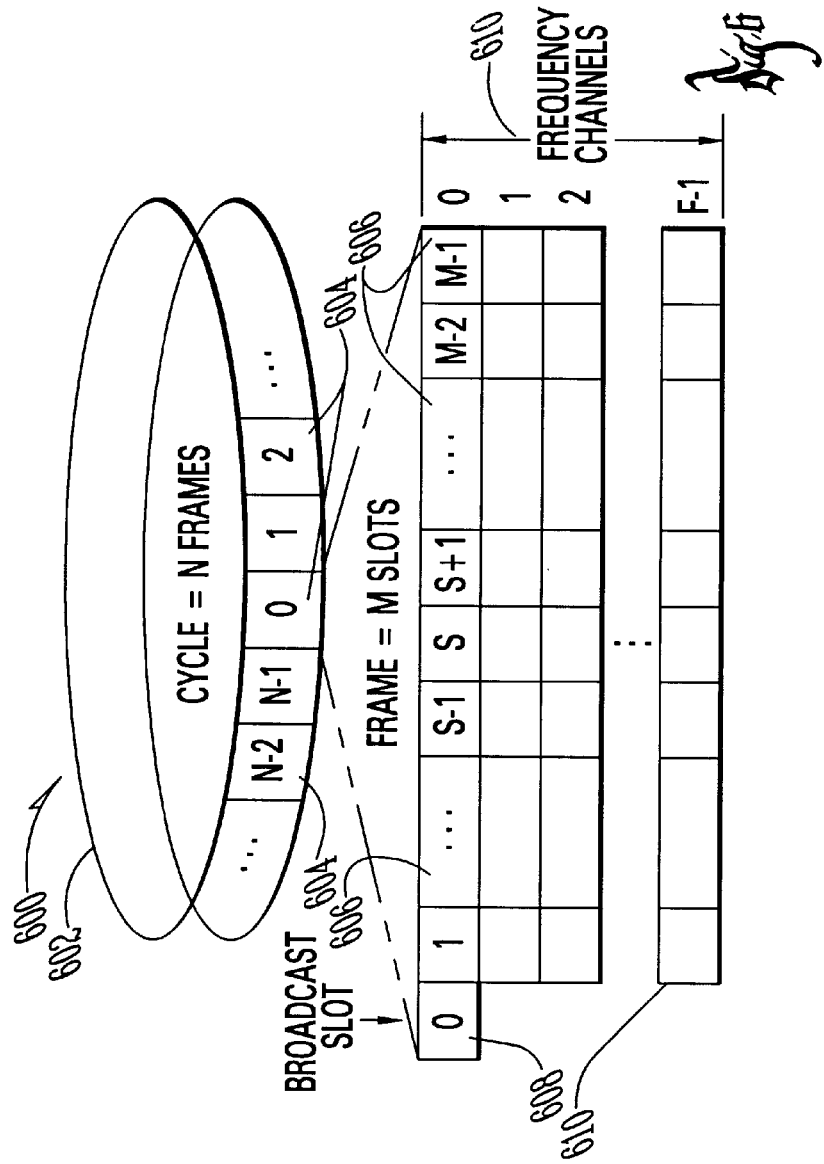

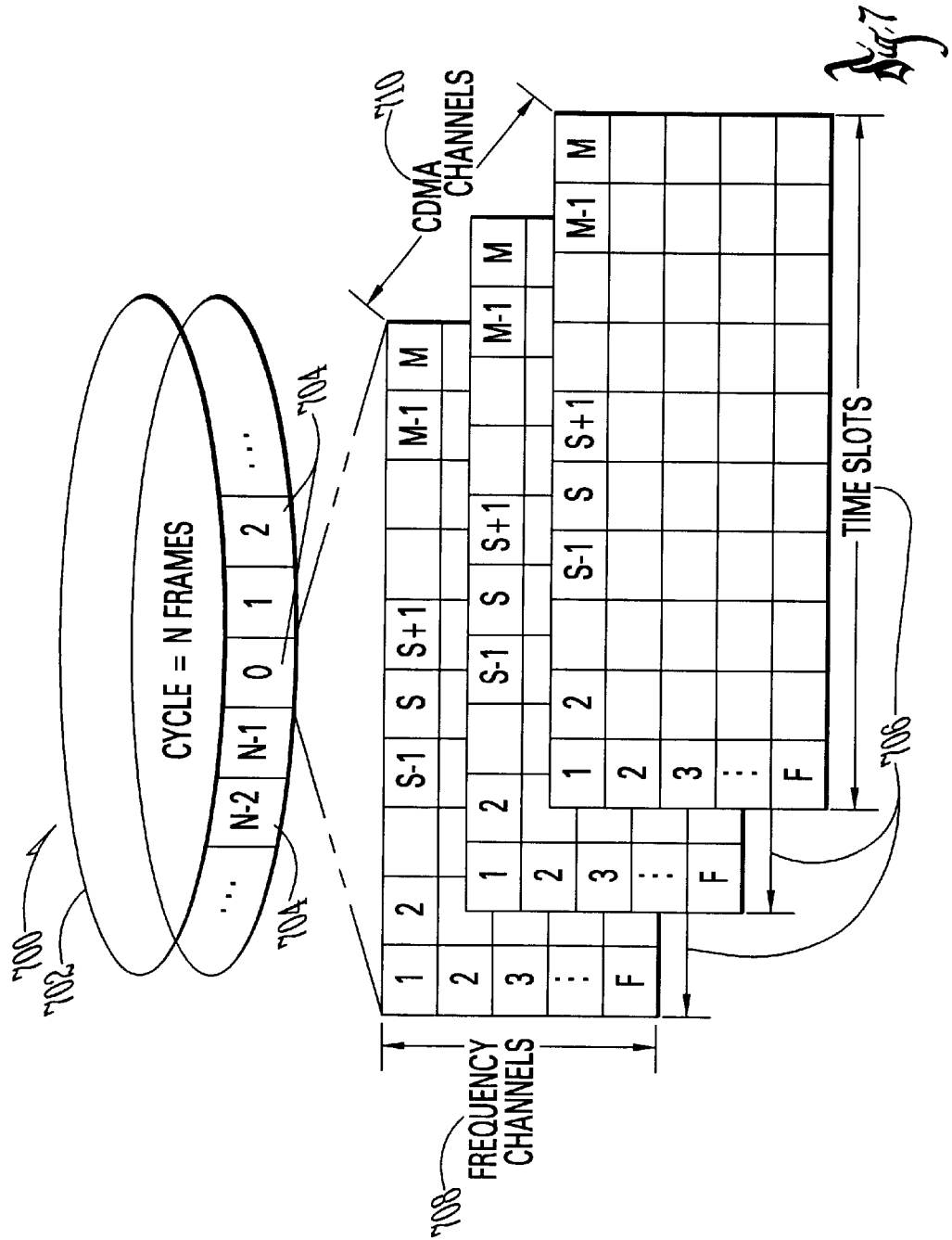

METHOD AND APPARATUS FOR ASSIGNING RECEIVE SLOTS IN A DYNAMIC ASSIGNMENT ENVIRONMENT

FIELD OF THE INVENTION

The present invention generally relates to a method for managing communication resources between nodes of a network, and more particularly relates to a dynamic, time multiplex slot assignment method and apparatus, and even more particularly relates to methods and apparatus for assigning receive slots in a dynamic, time multiplex slot assignment communication system.

BACKGROUND OF THE INVENTION

Mobile multi-hop packet radio networks are known for rapid and convenient deployment, self organization, mobility, and survivability. Such a network is illustrated in FIG. 1. A transmission from one node, from node $N_1$ of FIG. 1 for example, can be broadcast to all nodes in its "neighborhood". Ultra-high frequency (UHF) systems generally have a neighborhood defined by nodes located within line of sight of the transmitting node. The nodes of such a neighborhood are said to be located within one "hop" of the transmitting node. In FIG. 1, for example, nodes $N_1$, $N_3$, $N_4$, $N_5$, $N_6$, $N_7$ and $N_8$ are members of the neighborhood surrounding node $N_1$.

Nodes $N_2$, $N_9$, $N_{10}$, $N_{11}$ and $N_{12}$ are each located two hops away from node $N_1$ and node $N_{13}$ can be said to be three hops away from node $N_1$. When data transmitted from node $N_1$, is to be propagated multiple hops, the data must be relayed by one or more of node $N_1$'s neighbors. For example, data transmitted by node $N_1$, can be relayed by its neighbor node $N_8$ to a node such as node $N_{12}$ that is located two hops from node $N_1$.

Receivers are generally capable of processing only one transmission at a time. Simultaneous transmissions, also known as collisions, contentions or conflicts, can be avoided by assigning a specific transmission time slot to each communicating node. Several approaches have been developed for assigning slots to nodes. The approach chosen for a particular application is generally a consequence of the type of network application (broadcast, multicast, unicast, datagrams, virtual circuits, etc.) at issue. Since the problem of optimally assigning slots is mathematically intractable, a heuristic approach has been applied. This approach resulted in the development of an integrated protocol that both chooses the number of slots to assign to each neighboring node and coordinates their activation in the network.

Many applications require self-organizing, wireless networks that can operate in dynamic environments and provide peer-to-peer, multi-hop, multimedia communications. Key to this technology is the ability of neighboring nodes to transmit without interference. Neighboring nodes transmit without interference by choosing time slots and channels that do not cause collisions at the intended unicast or multicast receivers. The Unifying Slot Assignment Protocol (USAP), which is disclosed in U.S. Pat. No. 5,719,868, provides a protocol establishing such a communication system. USAP is a dynamic assignment protocol that monitors the RF environment and allocates channel resources on demand. It automatically detects and resolves contention between nodes for time slots, such contention arising for example from changes in connectivity. U.S. Pat. No. 5,719,868, issued Feb. 17, 1998, is hereby incorporated herein by reference in its entirety, including all drawings and appendices.

USAP permits a node to assign itself transmit slots based on information it has regarding when it is assigned to transmit and receive and when a neighboring node is scheduled to transmit. In certain applications, however, it is desirable or necessary to have a node assign itself a receive slot instead of a transmit slot. For example, a node may need to assign itself a communication slot wherein it can receive from one, some or even all of its neighbors.

Consequently, there exists a need for a dynamic assignment communication system capable of accommodating nodes that assign themselves a receive slot. The present invention provides a method and apparatus that enables a node to assign itself a receive slot.

SUMMARY OF THE INVENTION

It is an object of the present invention to provide an enhanced dynamic assignment communication system wherein a node can assign itself a receive slot.

It is a feature of the present invention to enable a node to assign itself a receive slot by utilizing information identifying the slots in which that node's neighbors' neighbors are receiving.

It is an advantage of the present invention to enable a node to assign itself a receive slot in which it can receive from one, some or all of its neighbors.

It is another object of the present invention to provide an enhanced dynamic assignment communication system wherein a node can assign itself a broadcast receive slot.

It is another feature of the present invention to permit a node to receive in a broadcast receive slot by utilizing a code division multiple access protocol.

It is an another advantage of the present invention to enable a node to assign itself a broadcast receive slot in which it can receive from some or all of its neighbors simultaneously.

The present invention is an apparatus and method for assigning communication receive slots in a dynamic assignment protocol. For example, in a network having a plurality of nodes, communication can be accomplished via assignment of specific time slots of a time multiplex structure. The time multiplex structure is analyzed and a set of available time slots is determined. The dynamic assignment protocol permits the node to assign itself a time slot from the set of available time slots.

Further, the broadcast reception feature of the present invention is carried out in a "contention-less" manner such that collisions between communications transmitted during the receive slot are avoided. Broadcast reception can be accomplished in a variety of ways. For example, a broadcast receive slot can be shared via a scheduling scheme. Alternatively, a random access reservation method can be employed. Further, a code division multiple access technique can be used to allow neighbor nodes to simultaneously transmit during the broadcast receive slot.

Accordingly, the present invention is a heuristic enabling receiver directed assignment of receive slots in a dynamic slot assignment environment.

BRIEF DESCRIPTION OF THE DRAWINGS

The invention may be more fully understood by reading the following description of the preferred embodiments of the invention, in conjunction with the appended drawings wherein:

FIG. 1 is a diagram of a network of nodes, the diagram also illustrating the neighborhood associated with three of the nodes.

FIG. 6 is a diagram of a time division multiple access structure suitable for use with the present invention.

FIG. 7 is a diagram of a time division multiple access structure including a plurality of code division multiple access channels suitable for use with the present invention.

DETAILED DESCRIPTION

The hardware of the nodes described throughout this specification includes a computerized processor for carrying out the processes described herein, a memory device for storing the shared communication assignment information, a simplex transceiver and an omnidirectional antenna. Thus, a node cannot transmit and receive at the same time, and a node generally cannot receive from more than one node at a time. In fact, two nodes transmitting at the same time, both being within transmission range of an intended receiver, can prevent the receiver from receiving any packet successfully. The data structures and rules can be modified, however, to enable the system to include full duplex radios or radios with multiple transmitters and receivers.

Figure 2:
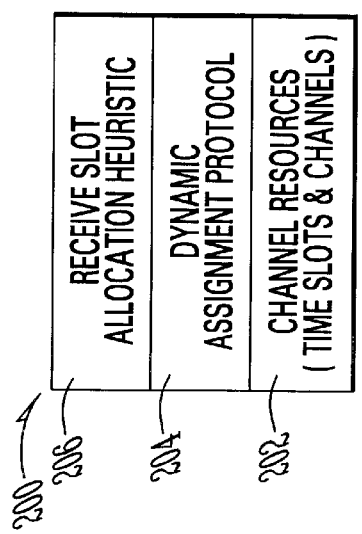
FIG. 2 is a block diagram illustrating the general structure of the system of the present invention.

FIG. 2 depicts the general relationships between the various components of the system 200 of the present invention. The system 200 comprises a dynamic assignment protocol, a receive slot allocation heuristic and the channel resources. Additional heuristics can also be included with the present invention. At the lowest level are the channel resources 202. As described below and in the incorporated patent, the channel resources 202 can include the time slots of a time multiplex structure. The channel resources 202 can also include a plurality of different communication channels, a plurality of different frequency channels for example, associated with each time slot. In addition, the channel resources 202 can include a plurality of code division multiple access (CDMA) channels.

The dynamic assignment protocol 204 occupies the next level. The dynamic assignment protocol 204 can be the USAP approach or some other suitable dynamic assignment protocol. The receive slot allocation heuristic 206 is integrated into the system 200 by the dynamic assignment protocol 204. The dynamic assignment protocol 204 can also integrate other higher-level heuristics (not shown) into the system 200. The higher-level heuristics are designed and chosen to meet the requirements of the application being served.

Prior to the development of USAP, a heuristic approach was typically taken to design an application specific protocol that both chose the number of time slots to assign to each neighboring node and coordinated their activation. The USAP approach separates the slot assignment mechanism from the heuristic and creates a single generalized protocol for reliably choosing the slots and coordinating their activation. A dynamic assignment protocol such as USAP can be used to support higher level heuristics.

A node can transmit to its neighbors via essentially one of two different methods. One method, node activation, allows only one active transmitter in a neighborhood in a given time slot. The other method, link activation, can permit more than one simultaneous transmission in the same time slot.

Figure 3:
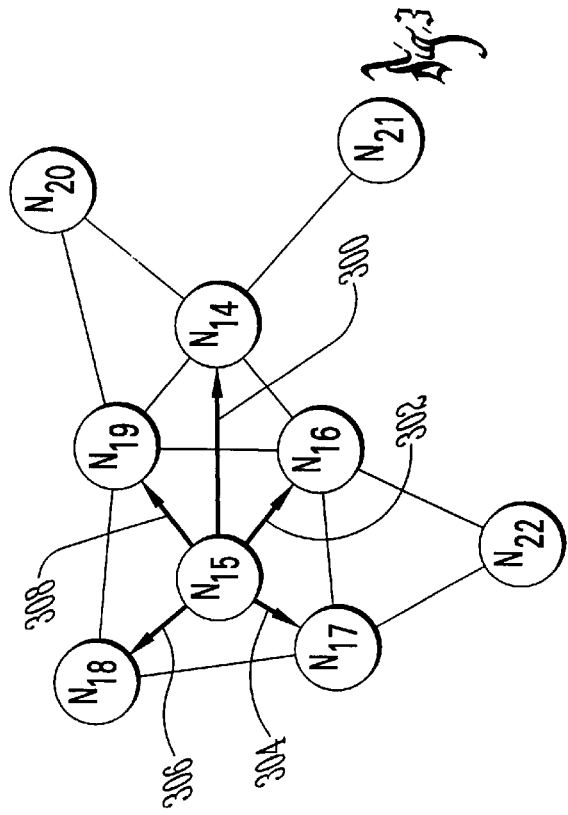
FIG. 3 is a diagram illustrating a node activation form of communication.

In the node activation technique, a single transmitting node communicates data to all of its neighbors simultaneously rather than on an individual basis. Node activation, also known as multicast or broadcast communication, is especially well suited for applications like address resolution and conferencing. The node activation technique is illustrated in FIG. 3. In FIG. 3, a transmitting node $N_{15}$ is simultaneously sending 300, 302, 304, 306, 308 the same broadcast communication to each of its neighbor nodes $N_{14}$, $N_{16}$, $N_{17}$, $N_{18}$ and $N_{19}$.

Figure 4:
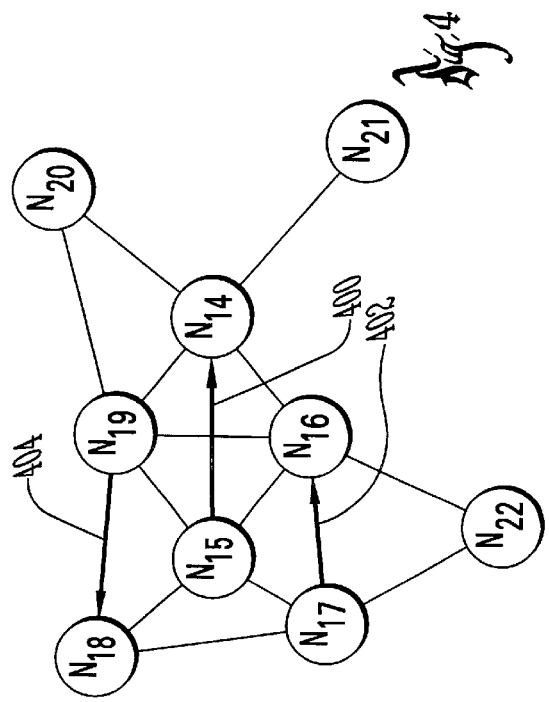
FIG. 4 is a diagram illustrating a link activation form of communication.

In the link activation technique, the transmitting node has only one intended receiver. Link activation, also known as unicast communication, better serves high volume point-to-point traffic. The link activation technique is illustrated in FIG. 4. In FIG. 4, three unicast transmissions are occurring simultaneously. Node $N_{15}$ is transmitting a unicast message 400 to node $N_{14}$, node $N_{17}$ is transmitting a unicast message 402 to node $N_{16}$ and node $N_{19}$ is transmitting a unicast message 404 to node $N_{18}$.

Figure 5:
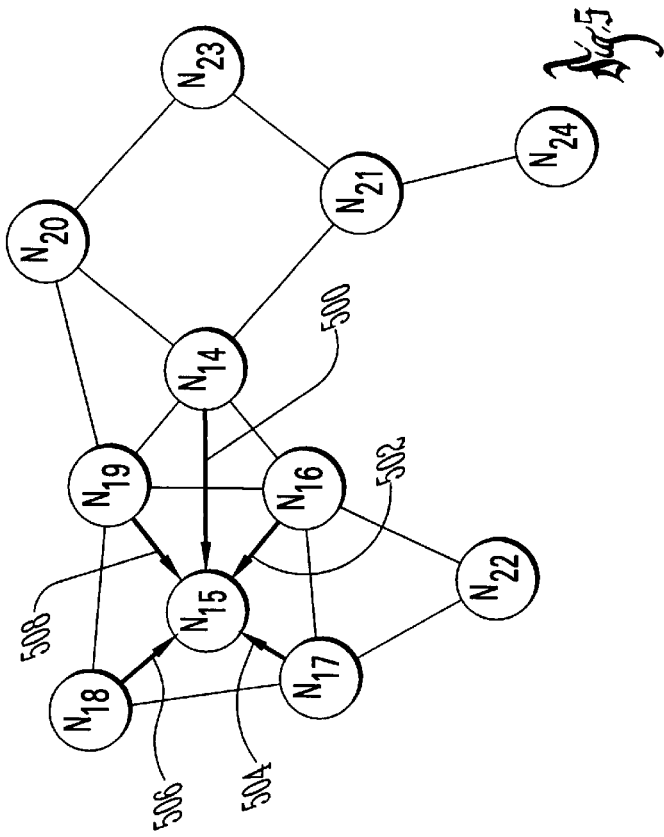
FIG. 5 is a diagram illustrating a receiver directed form of communication.

FIG. 5 illustrates a receiver directed assignment of a receive slot. In FIG. 5, node $N_{15}$ has five neighbor nodes $N_{14}$, $N_{16}$, $N_{17}$, $N_{18}$, $N_{19}$. Using a technique such as that described below, node $N_{15}$ has assigned itself a receive slot. In one embodiment, a node such as node $N_{15}$ may assign to itself a receive slot that is designated for reception of a transmission from one neighbor node. In this embodiment, only the communication 500 from node $N_{14}$ to node $N_{15}$, for example, would take place during the receiver assigned receive slot.

In other embodiments, a node assigns itself a receive slot designated for use by two, three, four or more of its neighbors. Referring to FIG. 5, for example, such embodiments would involve receive slot transmissions 500, 502, 504, 506, 508 from various combinations of two, three or four of node $N_{15}$'s neighboring nodes. In yet another embodiment, a node assigns itself a broadcast receive slot in which all of its neighbors can transmit to it. FIG. 5 provides an example of a receiver directed broadcast slot wherein all five of node $N_{15}$'s neighbors are transmitting 500, 502, 504, 506, 508. It need not be required, however, that all neighbor nodes transmit during a receiver directed broadcast slot. In many applications, only a subset of the neighbors will transmit during the designated broadcast slot.

FIG. 5 is representative of just one of the network configurations that may use the present invention. It will be appreciated that many different network configurations of various sizes, shapes, proportions and connectivity can use the present invention. Further, nodes having a greater or a fewer number of neighboring nodes, for example any of the nodes of FIG. 5, can use the present invention.

Referring to FIG. 6, a time multiplex structure 600 suitable for use with the present invention is depicted. The time multiplex structure 600 of FIG. 6 is a time division multiple access structure. One cycle 602 of the structure 600 includes "N" frames 604. The number of frames 604 required for a particular embodiment is determined by the specifics of the underlying application.

FIG. 6 also illustrates the structure of a representative frame of the cycle. The time allocated to the representative frame is shown divided into "M" distinct time slots 606. It will be appreciated that different numbers of time slots can be used in the various embodiments of the invention. The first slot of each frame 604 of the cycle 602 is a broadcast slot 608 for network management control packets. One of the N broadcast slots 608 is assigned to each node in the network. Therefore, for a network having N nodes, each node will transmit its control packet once during each cycle 602. More than one broadcast slot per frame can be used if it is desired that each node transmit multiple control packets per cycle 602. Further, the broadcast slots can be dynamically assigned using the USAP approach described herein.

Each frame 604 can also include multiple frequency channels 610. In FIG. 6, "F" different frequency channels are illustrated in the representative frame. Different embodiments of the invention include different numbers of time slots 606, channels 610 and/or frames 604.

To determine whether a slot and a channel are available for allocation to a broadcast or a unicast transmission, the USAP methodology of incorporated U.S. Pat. No. 5,719,868 may be applied. Other alternative methodologies exist, however, and can be used in lieu of the USAP methodology.

In the USAP approach, specific constraints on communication slot allocation are included to avoid interference at any node located within two hops of the transmitting node. For a system, such as USAP, including multiple frequency channels, an allocation involves specification of both a time slot and a frequency channel. For a USAP unicast transmission from a node i to a neighboring node j, the transmit slot allocation is a slot:

that has not already been assigned to node i or node j;

in which node i's neighboring nodes are not receiving; and in which node j's neighboring nodes are not transmitting.

For a multicast communication originating from a node i, the transmit slot. allocation by node i must be one:

that has not already been assigned to node i or any of node i's neighboring nodes; and in which none of node i's neighbors' neighbors are transmitting.

For a node i to assign itself a receive slot, the receive slot allocation made by node i must be one:

that has not already been assigned to node i or node j;

in which node i's neighboring nodes are transmitting; and in which node j's neighboring nodes are receiving.

For a node i to assign itself a broadcast receive slot, the allocation by node i must be one:

that has not already been assigned to node i or any of node i's neighboring nodes; and in which none of node i's neighbors' neighbors are receiving.

A node such as node i insures that its allocations satisfy the above constraints by sharing the following USAP slot sets with its neighboring nodes:

STi—allocations in which node i is transmitting;

SRi—allocations in which node i is receiving; and

NTi—allocations in which node i's neighbors are transmitting.

In addition, to enable a node such as node i to assign itself a receive slot, the following USAP slot set also must be shared:

NRi—allocations in which node i's neighbors are receiving.

In a system where member nodes assign themselves only receive slots, and not transmit slots, the USAP approach as further described in incorporated U.S. Pat. No. 5,719,868 can be modified. In such a system, a node would need to share only the $STi(s,f)$, $SRi(s,f)$ and $NRi(s,f)$ slot sets in its control packet. In a system where transmit slots are also being assigned, the composite task would include sharing of the $STi(s,f)$, $SRi(s,f,)$ and $NTi(s,f)$ slot sets in addition to the $NRi(s,f)$ slot set.

The size of the above-defined slot sets will vary according to network density and the number of slots and channels being managed. To minimize the size of the control packet, the slot set information can be encoded, for example, as bit maps or as lists. Sharing of the slot set information via the control packets enables USAP to 1) select non-conflicting allocations consistent with the most recent topology measurements, and 2) detect and report conflicts caused by topology changes.

After a transmit allocation is selected, a node has the option of transmitting immediately or waiting until a confirmation is received from each neighbor. The unconfirmed mode is appropriate when it is acceptable to have momentary conflicts due to coincident changes in connectivity or conflicting allocations. The confirmed mode verifies that all neighbors are aware of the allocation and that nothing has occurred to make the allocation inconsistent with the current topology or the other nodes' allocations.

When a broadcast receive allocation has been selected, there will usually be no need to utilize a confirmation system. Neighboring nodes will be free to transmit as soon as they have been notified of the allocation. In some circumstances, however, a confirmation process will be included wherein the neighboring node or nodes confirm the allocation.

To allocate a receive slot, a node first generates the set of slots that are not available because they are already in use locally. In the description that follows, the subscript "i" denotes information about the node performing the allocation and "j" denotes the corresponding information reported by a neighboring node.

The assignments are represented by:

S=set of M time slots

F=set of F frequency channels.

For a given channel and time slot pair $(s,f)$, the allocating node's transmit/receive sets are:

$STNi(s, f)$=set of neighbors to which node i transmits on $(s, f)$ $SRNi(s, f)$=set of neighbors from which node i receives on $(s, f)$.

The following sets are then derived:

$STi(s, f)$=1 if $STNi(s, f)$ not empty, else 0

$SRi(s, f)$=1 if $SRNi(s, f)$ not empty, else 0.

The neighbor node transmit/receive sets are:

$STj(s, f)$=the $STi(s, f)$ reported by a neighbor node j $SRj(s, f)$=the $SRi(s, f)$ reported by a neighbor node j.

Next, the following sets can be derived:

$NTi(s, f)=U STj(s, f)$ over all neighbors j of node i $NRi(s, f)=U SRj(s, f)$ over all neighbors j of node i $NTj(s, f)$=the $NTi(s, f)$ reported by a neighbor node j.

In addition, since $NRi(s,f)$ is being shared in the control packets, the following slot set can also be determined:

$NRj(s, f)$=the $NRi(s, f)$ reported by a neighbor node j.

If a node i or a neighbor node j is transmitting or receiving (on any channel) in slot s, it is blocked from performing any other communication during slot s. To this end, the following derived sets are useful:

$Bi(s)=STi(s, f) \cup SRi(s, f)$ for any f $Bj(s)=STj(s, f) \cup SRj(s, f)$ for any f.

To decide which slots and channels are available for unicast receive allocation, a node i constructs the blocked allocations for receiving from a given neighbor node j by excluding allocations:

that have been already assigned to node i or node j: Bi(s)UBj(s)

in which node i's neighbors are transmitting: NTi(s,f)
in which node j's neighbors are receiving: NRj(s,f).
This information is combined as follows:
Blocked(i,j, s, f)=Bi(s) U Bj(s) U NTi(s, f) U NRj(s, f)
Blocked(i,j, s, f)=1 if node i cannot receive from node j in (s, f), else
Blocked(i, j, s, f)=0.

To decide which slots and channels are available for broadcast receive allocation, a node i constructs the blocked allocations for receiving from all of its neighbors by excluding allocations:

that have been already assigned to node i: Bi(s)
that have been already assigned to any of node i's neighbors: UBj(s)
in which any of node i's neighbors' neighbors are receiving: UNRj(s,f).

This information is combined as follows:
Blocked(i, s, f)=Bi(s) U Bj(s) U NRj(s, f)
Blocked(i, s, f )=1 if i cannot receive from any of its neighbors in (s, f), else
Blocked(i,s,f)=0.

The slots not contained in Blocked(i,s,f) are available to node i for assignment as a broadcast receive slot. When node i allocates one of the available slots for such a purpose, it can receive therein a transmission from any of its neighbor nodes j, without creating conflicts for any other potential receivers in its neighborhood.

In some networks it may be desirable to reduce the noise floor at the receivers by adding an additional hop of isolation before an allocation is reassigned. This can be accomplished by defining the set of nodes that are receiving within three hops of node i on an location as:

NNRi(s,f)=UNRj(s, f) over all neighbor nodes of node i.

If this is also included in the control packet and stored at the neighbor of node i as NNRj(s,f), and if Blocked (i,j,s,f) is generated as follows, conflicting receptions within three hops of a receiving node will be prevented:

Blocked(i,j,s,f)=Bi(s) U Bj(s) U NTi(s, ) U NRj(s,f) U NNRj(s,f)
Blocked(i, j, s, f)=1 if node i cannot receive from a neighbor node j in (s, f), else
Blocked(i,j,s,f)=0.

The USAP approach provides contention-less slot assignment with respect to all nodes except the receiving node itself. When a node has assigned itself a broadcast receive slot, any of its neighbors can transmit to it without conflict. If more than one neighbor node attempts to transmit in the same broadcast receive slot, however, their transmissions can collide at the receiving node.

The contention described in the preceding paragraph can be avoided by implementing any of several different techniques. One technique can be characterized as a scheduling technique. One scheduling technique, for example, involves establishment of a round robin sharing of the broadcast receive slot. In implementing this technique, a portion of the allocated broadcast receive slot is assigned to each neighboring node. Each node then transmits to the receiving node only during its portion of the receive slot. For example, referring to FIG. 5, node $N_{14}$ would communicate 500 its data during the first fifth of the broadcast receive slot, node $N_{16}$ would communicate 502 its data during the second fifth of the broadcast receive slot, and so forth for each of the remaining neighbor nodes $N_{17}$, $N_{18}$ and $N_{19}$.

Alternatively, the round robin technique can be implemented by requiring that each neighboring node transmit only during a broadcast receive slot of a designated frame. For example, referring to FIG. 5, node $N_{14}$ would communicate 500 its data during the broadcast receive slot of a first frame of the cycle, node $N_{16}$ would communicate 502 its data during the broadcast receive slot of a second frame of the cycle, and so forth for each of the remaining neighbor nodes $N_{17}$, $N_{18}$ and $N_{19}$. Many different variations and arrangements are possible.

A scheduled technique such as the round robin technique can be used in several applications. It is best implemented in networks where it is anticipated that a significant number of neighboring nodes will transmit to the receiving node during each broadcast receive slot. In situations involving a bursty communication traffic environment, the technique becomes less efficient since many slots or portions of slots would remain idle. In addition, in dynamic environments where the number of neighbors often changes, the scheduled technique becomes more difficult to manage.

A second technique for avoiding the contention described above, involves implementing a random access technique. For example, one random access technique involves establishment of a request-to-send/clear-to-send (RTS/CTS) reservation of the broadcast receive slot. With this technique, a node with information to transmit during the broadcast receive slot first sends a request-to-send packet to the receiving node. If the broadcast receive slot is still available, the receiving node will reply with a clear-to-send packet and the broadcast receive slot will be reserved for use by the requesting node. The second technique can be employed in applications where it is acceptable 1) to use a portion of the broadcast receive slot for broadcast transmission of the clear-to-send packet by the receiving node, and 2) to sacrifice the overhead required at the beginning of the broadcast receive slot for the RTS/CTS transmissions. In certain applications, however, this type of spatial reuse and burdening of the broadcast receive slot is overly constraining and inefficient.

Implementation of a CDMA protocol provides yet another available technique for avoiding contention during the broadcast receive slot. Use of CDMA permits multiple neighbors to transmit simultaneously on orthogonal spreading codes. Implementation of a CDMA technique can be accomplished in those environments and applications where the added hardware cost is acceptable. Further, CDMA also avoids the overhead, management, spatial reuse and efficiency factors noted with respect to the previously described techniques. Further still, implementation of CDMA brings the added benefit of potentially multiplying network throughput since multiple simultaneous transmissions to a single receiving node are permitted.

Referring now to FIG. 7, an embodiment, suitable for use with the present invention, of a time multiplex structure 700 including a CDMA protocol is illustrated. The time multiplex structure 700 includes a time division multiple access structure. One cycle 702 of the structure 700 includes "N" frames 704. As noted above, the number of frames 704 required for a particular embodiment is determined by the specifics of the underlying application.

FIG. 7 also illustrates the structure of a representative frame of the cycle. The time allocated to the representative frame is shown divided into "M" distinct time slots 706. It will be appreciated that different numbers of time slots can be used in the various embodiments of the invention. Although not specifically depicted in FIG. 7, the first slot of each frame 704 of the cycle 702 can be a broadcast slot for network management control packets. The description and depiction regarding the broadcast slots 608 of FIG. 6 is also applicable to the structure depicted in FIG. 7.

Each frame 704 can also include multiple frequency channels 708. In FIG. 7, "F" different frequency channels are illustrated in the representative frame. Different embodiments of the invention include different numbers of time slots 706, frequency channels 708 and/or frames 704.

In addition, FIG. 7 depicts a plurality of CDMA channels 710. The CDMA approach is used commercially with orthogonal spreading codes to permit the stacking of multiple users on a single frequency channel. Inclusion of this feature permits a receiving node to receive simultaneous transmissions from its neighboring nodes without conflict at the receiving node or at the other receivers of the neighborhood. The embodiment of FIG. 7 includes several different CDMA channels 710, three of which are depicted. Different embodiments of the invention include different numbers of CDMA channels 710.

In certain applications, it is desirable for security purposes to use random spreading codes. Unfortunately, the use of random codes results both in a loss of favorable cross correlation properties and in an increase in the number of communication errors. These problems can be mitigated, however, by giving the receiving node knowledge of the possible spreading codes that its neighboring nodes will use during the receive slots for their receiver directed transmissions.

Provided that the system employs a suitably robust preamble and uses multiple correlators, the receiving node will be able to simultaneously synchronize itself with multiple transmitters. For example, one embodiment uses a receiving node having a programmable preamble-matched filter, a transec decoder and a CDMA code correlator tailored to each transmitter from which it expects to receive a transmission. Maximal length sequence codes having good correlation properties can be used for the preamble codes.

In one embodiment, for example, the preamble code can be an orthogonal code. In an additional embodiment, the preamble code can be a Gold code, which is a maximal length sequence generated by linear feedback shift registers. While Gold codes typically have a cross-correlation value of "1" and are not considered orthogonal, they can be made orthogonal by adding a "0" to the end of the sequence.

Each preamble-matched filter is programmed with the same preamble code used by the intended transmitter. Thus, each preamble-matched filter is tailored to receive transmissions from a particular transmitting node. When a preamble code is received, it will be detected by the appropriate preamble-matched filter. After detecting a matching preamble code, sufficient receiver timing is acquired to remove the random transec code. At this point, the CDMA code correlator despreads the signal by removing the orthogonal CDMA spreading codes and the transmitted data is obtained.

The number of simultaneous transmissions that a receiving node can successfully acquire is limited. The application will dictate the level of performance demanded of the system. For example, in a voice conferencing application, where one or more other speakers may occasionally interrupt a first speaker, thereby creating simultaneous transmissions at the receiving node, the receiving node may be required to handle no more than three or four simultaneous transmissions. Other applications will place greater or lesser such demands on the system. These demands should be taken into account when determining which contention avoidance technique to implement for a given application.

As noted with regard to FIG. 6, the USAP methodology of incorporated U.S. Pat. No. 5,719,868 also may be applied to the embodiments related to FIG. 7. The USAP approach, as described herein and in the incorporated patent, can be applied to determine whether a slot and a channel are available for allocation to a broadcast or a unicast transmission or reception. Other alternative methodologies, however, can be used in lieu of the USAP methodology.

It is thought that the method and apparatus of the present invention will be understood from the descriptions and depictions provided throughout this specification and the appended claims, and that it will be apparent that various changes may be made in the form, construct steps and arrangement of the parts and steps thereof, without departing from the spirit and scope of the invention or sacrificing all of their material advantages. The form herein described is merely an exemplary embodiment thereof.

We claim:

1. A method of managing communication resources to permit receiver-directed receive slot allocation in a network having a plurality of nodes, each node communicating during specific time slots on a time multiplex basis, the method comprising:

establishing a network comprising a plurality of nodes, wherein network communication is accomplished via assignment of specific time slots of a time multiplex structure, said plurality of nodes participating in a dynamic assignment protocol wherein a node of said plurality of nodes is capable of assigning itself a time slot from said time multiplex structure;

determining a set of available time slots that are suitable for reception by said node of said plurality of nodes of a communication from a neighboring node;

assigning to said node of said plurality of nodes a receive slot from said set of available time slots, said receive slot having been assigned by said node; and accessing using a random access technique to coordinate communication;

wherein said receive slot is a broadcast receive slot.

2. The method of claim 1, wherein said dynamic assignment protocol comprises a unifying slot assignment protocol.

3. The method of claim 1, wherein said time multiplex structure comprises a time division multiple access protocol.

4. The method of claim 1, wherein said time multiplex structure further comprises a plurality of frequency channels.

5. The method of claim 1, wherein said time multiplex structure further comprises a plurality of code division multiple access channels.

6. The method of claim 1, wherein said determining step comprises excluding from said set of available time slots those time slots in which a neighbor of said neighboring node is receiving.

7. The method of claim 1, further comprising the step of using said receive slot, by said node, to receive a communication from at least one neighboring node of said node of said plurality of nodes.

8. A method of managing communication resources to permit receiver-directed receive slot allocation in a network having a plurality of nodes each node communicating during specific time slots on a time multiplex basis, the method comprising:

establishing a network comprising a plurality of nodes, wherein network communication is accomplished via assignment of specific time slots of a time multiplex structure, said plurality of nodes participating in a dynamic assignment protocol wherein a node of said plurality of nodes is capable of assigning itself a time slot from said time multiplex structure;

determining a set of available time slots that are suitable for reception by said node of a communication from a neighboring node; and assigning to said node a receive slot from said set of available time slots, said receive slot having been assigned by said node;

wherein said determining step comprises excluding from said set of available time slots those time slots in which a neighbor of said neighboring node is receiving.

9. The method of claim 8, wherein said time multiplex structure comprises a plurality of code division multiple access channels.

10. The method of claim 8, further comprising a scheduling step using a scheduling technique to coordinate communication.

11. The method of claim 8, wherein said determining step further comprises excluding from said set of available time slots those time slots that have been assigned to a neighbor of said node of said plurality of said nodes.

12. The method of claim 11, wherein said determining step further comprises excluding from said set of available time slots those time slots that have been assigned to said node of said plurality of said nodes.

13. The method of claim 8, further comprising the step of using said receive slot, by said node, to receive a communication from at least one neighboring node of said node of said plurality of nodes.

14. A method of managing communication resources to permit receiver-directed receive slot allocation in a network having a plurality of nodes, each node communicating during specific time slots on a time multiplex basis, the method comprising:

establishing a network comprising a plurality of nodes, wherein network communication is accomplished via assignment of specific time slots of a time multiplex structure, said plurality of nodes participating in a dynamic assignment protocol wherein a node of said plurality of nodes is capable of assigning itself a time slot from said time multiplex structure;

determining a set of available time slots that are suitable for reception by said node of a communication from a neighboring node;

assigning to said node a receive slot from said set of available time slots, said receive slot having been assigned by said node; and using said receive slot, by said node, to receive a communication from at least one neighboring node of said node of said plurality of nodes.

15. The method of claim 14, wherein said time multiplex structure comprises a time division multiple access protocol.

16. The method of claim 14, wherein said time multiplex structure further comprises a plurality of frequency channels.

17. The method of claim 14, further comprising a scheduling step using a scheduling technique to coordinate communication.

18. The method of claim 14, wherein said determining step comprises excluding from said set of available time slots those time slots in which a neighbor of said neighboring node is receiving.

19. The method of claim 14, wherein said time multiplex structure further comprises a plurality of code division multiple access channels and wherein said using step comprises a code division multiple access technique enabling simultaneous reception of communications by said dynamic node.

20. The method of claim 19, wherein said receive slot is a broadcast receive slot, and further wherein said node has knowledge of possible spreading codes that can be used by said at least one neighboring node when communicating in said broadcast receive slot.

* * * * *